United States Patent [19]
Fink

[11] Patent Number: 5,212,747
[45] Date of Patent: May 18, 1993

[54] ZERO LOSS WAVEGUIDE COUPLER

[75] Inventor: David Fink, Los Angeles, Calif.

[73] Assignee: Hughes Aircraft Company, Los Angeles, Calif.

[21] Appl. No.: 871,886

[22] Filed: Apr. 21, 1992

[51] Int. Cl.⁵ .............................................. G02B 6/32
[52] U.S. Cl. ....................................... 385/33; 372/108
[58] Field of Search ...................... 372/6, 108, 26, 18, 372/107; 385/31, 33, 34, 35, 147; 359/727, 732

[56] References Cited

U.S. PATENT DOCUMENTS 4,934,784 6/1990 Kapany et al. ..................... 385/33
5,027,359 6/1991 Leger et al. ........................ 372/18

Primary Examiner—Akm E. Ullah
Assistant Examiner—John Ngo
Attorney, Agent, or Firm—William J. Streeter; Wanda K. Denson-Low

[57] ABSTRACT

A waveguide coupler comprises a curved end reflector mirror that images a waveguide exit back into the waveguide with an essentially exact reproduction of the waveguide output intensity distribution. The coupler also comprises a lens disposed near the waveguide exit at a point between the exit and the mirror, the lens providing a phase compensation to the beam passing therethrough such that the phase of the beam returned to the waveguide matches that of the exiting beam. Thus, coupling losses due to clipping of the returned beam at the exit/entrance to the waveguide bore and coupling losses due to a mismatch of the returning field phase to that of the waveguide mode are made essentially zero. Other embodiments of the coupler are presented wherein the phase compensating lens is positioned at locations other than adjacent to the waveguide exit, or wherein no inversion of the imaged field field distribution occurs, or wherein the beam is not caused to be focused at the center of a lens, or wherein one waveguide is coupled to another waveguide having a similar sized or a dissimilar sized bore.

29 Claims, 3 Drawing Sheets

ZERO LOSS WAVEGUIDE COUPLER

BACKGROUND OF THE INVENTION

This invention relates generally to lasers and, more particularly, to an optical coupler for a waveguide laser that in operation introduces no coupling losses to a beam of laser radiation that exits an end of the laser waveguide, propagates to a mirror, and is reflected back into the waveguide, or, alternatively, into the entrance of another waveguide.

A particular problem encountered in the design of lasers and, in particular, waveguide lasers is the energy loss associated with the coupling of the laser beam from an end of the laser waveguide to a mirror and back into the waveguide. This energy loss problem is also encountered when it is desired to couple a beam from one laser waveguide into another. Such energy losses are caused both by clipping of the optical field at the exit-/entrance to the waveguide and by any mismatch between the amplitude and phase distribution of the returning field and that of the waveguide mode. If such a mismatch condition is present, the waveguide will act as a filter and attenuate the propagating field until the field matches the waveguide mode. This attenuation of the field results in an energy loss, which further results in a reduction in laser output power.

The amount of coupling loss as a function of mirror position for curved end mirrors with a waveguide laser having a circular bore was first characterized by R. L. Abrams in 1972 (IEEE J. Quant. Elect. OE-8, 838, November 1972). Since 1972, square bore waveguide lasers have become more widely utilized but, in general, the design of the coupling optics has remained essentially the same.

FIG. 1 is adapted from the above mentioned journal article (p. 841) and shows the minimum possible coupling loss for an optimally curved single end mirror placed at a distance Z from the end of a circular bore waveguide. The parameter b is equal to $0.325 D^2/\lambda$, where D is the diameter of the waveguide bore and $\lambda$ is the wavelength of the radiation that comprises the laser beam.

As an example, for a waveguide laser having a 2 mm diameter bore where $\lambda = 10.6 \mu m$, b will equal 12.3 cm. It can be seen by reference to FIG. 1 that in order to achieve a coupling loss below 0.5% that the mirror must be closer than 0.37 mm or farther than 250 cm from the end of the bore. If 1.5% losses are acceptable, the mirror must be closer than 1.2 cm or farther than 120 cm or exactly at 12.3 cm. The additional 2% of round trip loss experienced by the laser beam (1.5% versus 0.5% at each end of the laser) may result in as much as a 40% reduction in a typical waveguide laser's output power. As may as appreciated, the physical construction of a particular waveguide laser or other factors, such as possible damage to the optics by the cavity plasma, may prohibit the placement of coupling optics at an optimal position, such as adjacent to the end of the bore. Thus, the coupling loses experienced by the laser may be prohibitively high. Furthermore, the known coupling methods are incapable of coupling between lasers having bores of differing sizes. Also, waveguide lasers constructed with known coupling methods must rely entirely on waveguide losses to attain mode discrimination.

SUMMARY OF THE INVENTION

The foregoing problems are overcome and other advantages are provided by a laser coupler, constructed in accordance with the invention, that utilizes well known spherical optics to couple a laser beam out of and back into the laser waveguide with no clipping loss and with an essentially identical laser mode field distribution, resulting in an essentially zero coupling loss.

In an illustrative embodiment, the coupler of the present invention comprises a curved end reflector mirror that images a waveguide laser's exit plane back into the waveguide with an essentially exact reproduction of the waveguide output intensity and phase distribution. The coupler also comprises a lens disposed near the waveguide exit at a point between the exit opening and the mirror, the lens providing a phase compensation to the beam passing therethrough such that the phase of the beam returned to the waveguide matches that of the exiting beam. Thus, coupling losses due to clipping of the returned beam at the entrance to the waveguide bore and coupling losses due to a mismatch of the returning field phase to that of the waveguide mode are made essentially zero.

Other embodiments of the present invention are presented wherein the phase compensating lens is advantageously positioned at locations other than adjacent to a waveguide exit, or wherein no inversion of the imaged field distribution occurs, or wherein the beam is not caused to be focused at the center of a lens, or wherein one waveguide laser is coupled to another waveguide laser having a similar sized or a dissimilar sized bore.

BRIEF DESCRIPTION OF DRAWINGS

The foregoing aspects and other features of the invention are explained in the following description, taken in conjunction with the accompanying drawings wherein.

DESCRIPTION OF THE PREFERRED EMBODIMENTS

This Application is related to my copending Application entitled "High Resolution Spectral Line Selector" Ser. No. 67/871,878 filing date Apr. 21, 1992 also assigned to the assignee of the present Application and filed on even date herewith.

The present invention advantageously makes use of the fact that the energy radiated from an exit of a waveguide laser does not propagate in all directions, but is confined to a small angle about the nominal direction of propagation of the radiation. Therefore a relatively small lens (or curved mirror) may be used to capture substantially all of the radiated energy and to thereby form an image of the waveguide exit plane, wherein the lens, waveguide exit, and image locations are related by the usual, well known, geometric optics lens equation. For example, for a 2 mm bore waveguide operating at a wavelength of 10.6 μm, substantially all of the energy is contained within an f/10 cone.

If substantially all of the radiated energy is captured by a lens or mirror and used to form the image, the image field distribution will be essentially an exact scaled replica of the object field distribution (with no diffractive effects), with the exception of the addition of a spherical phase curvature. The scaling magnification (M) is equal to the ratio of the image distance to the object distance, and the additional spherical phase curvature has a divergent radius of curvature of $-Mf$, where M is the aforementioned scaling magnification, f is the focal length of the lens or mirror, and the negative sign indicates divergent.

It is convenient to measure the phase curvature by the reciprocal of the divergent radius so that the result of successively applied phase curvatures can be found by algebraic addition. Phase curvature is proportional to the phase deviation of the field from flat. The result of the imaging described above, then, is to scale the field and apply a divergent phase curvature of $-1/(Mf)$.

By selecting both the image and the object distances to be the same, the image field is made to match the field at the waveguide exit except for a phase curvature of $-1/f$. If one-half of this curvature is compensated for at the waveguide exit by the use of a compensating lens that impresses a phase curvature of $+1/(2f)$ upon the beam, and the remaining one-half of the curvature is compensated for by a similar lens at the image plane, the final phase distribution will have no added phase curvature and will substantially match that of the original phase distribution at the waveguide exit. The next waveguide entrance is placed at this image location.

Figure 1:
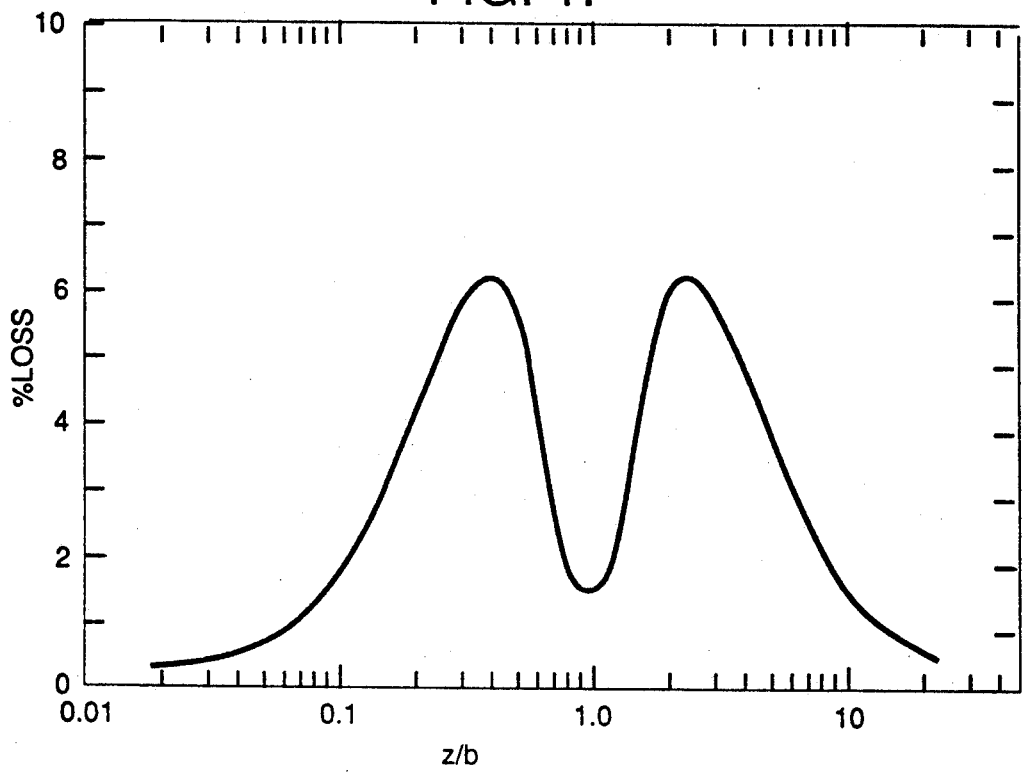
FIG. 1 is a graph adapted from the prior art showing the coupling loss of a waveguide laser (expressed as per cent) along the ordinate and a value related to the position of end reflector mirrors along the abscissa for an optimally curved mirror at each position.
Figure 2:
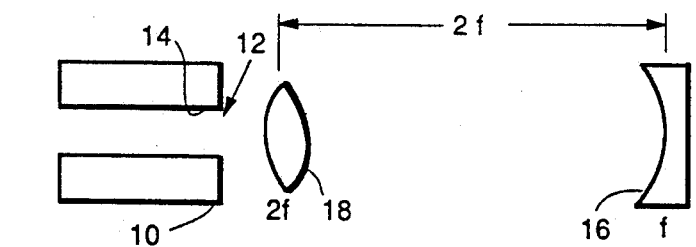
FIG. 2 is a schematic representation of an end-reflector embodiment of the present invention.

An end-reflector embodiment of the zero-loss coupler of the present invention is shown in FIG. 2. A laser waveguide 10 has an exit 12 of a bore 14, which may have a circular square or other centro-symmetric cross-sectional shape. A curved mirror 16 images the exit 12 back into the waveguide bore, the image being an essentially exact reproduction of the intensity distribution of the exit radiation. A compensator lens 18 provides a phase compensation to the radiation such that the phase of the reflected radiation also matches that originally presented at the waveguide exit 12. Such a system may be considered to be a substantially perfect imager with no diffractive effects, and therefore couples substantially perfectly back into the waveguide mode. As can be seen in FIG. 2, mirror 16 and lens 18 are spaced apart by a distance of 2f, the mirror 16 having a focal length of f. Consequently, lens 18 is selected to have a focal length of 2f.

The aforementioned equal splitting of the phase compensation between exit and entrance may be required for such an end mirror 16 that exits-reflects-couples back into the same waveguide, inasmuch as the same physical compensator lens 18 is used for both compensator locations. However, when it is desired to couple radiation from one waveguide to another, as is depicted in FIG. 3, only the total compensation must be preserved; that is, it can be split between the exit and entrance locations in any way.

Figure 3:
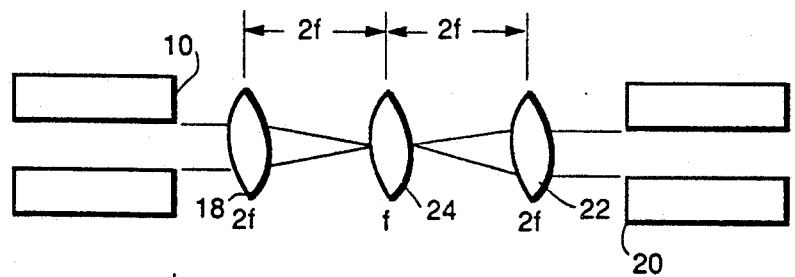
FIG. 3 is a schematic representation of a waveguide to waveguide embodiment of the present invention having equal phase compensation at each end.

As shown in FIG. 3, a first waveguide 10 has an output beam that is coupled to a second waveguide 20. The exit of waveguide 10 and the entrance of waveguide 20 have a substantially identical opening size and shape.

If the shape is not centro-symmetric (that is, having inversion symmetry about its center), then waveguide 20 must be rotated 180 degrees about its axis, relative to waveguide 10. An imaging lens 24 having a focal length f is disposed at a distance 2 f from each of the compensating lenses 18 and 22, each of which has a focal length of 2 f. Each of the lenses 18 and 22 provides a substantially equal amount of phase compensation to the beam which, in conjunction with imaging lens 24, results in an essentially zero coupling loss between waveguide 10 and waveguide 20.

If the phase compensation is divided equally between the exit and entrance as in FIG. 3, the focal length of each compensating lens 18 and 22 is substantially equal to the distance to the imaging lens 24, such that each compensating lens may focus substantially all of the radiation from a waveguide through the center of the imaging lens 24. The required diameter of the imaging lens is thus greatly reduced since it no longer must be larger than the free-propagation size of the waveguide radiation cone, but just larger than the focused spot size. Such focusing of the radiation may lead to heating effects within the imaging lens, but such effects may be avoided by use of other embodiments of the invention, as will be described hereinafter. Also, in such a waveguide-to waveguide coupler, as opposed to the end mirror coupler shown in FIG. 2, the two compensating lenses may be designed to provide for other than equal division of the total phase compensation. Such an unequal division may be employed to prevent the focusing of the beam upon the imaging lens.

Figure 4:
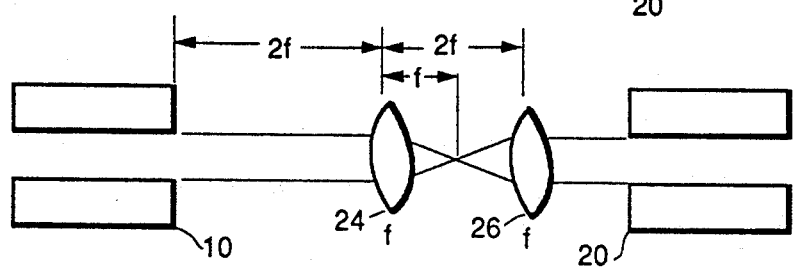
FIG. 4 is a schematic representation of a waveguide to waveguide embodiment of the present invention having all of the phase compensation at one end.

FIG. 4 shows a variation of the waveguide to waveguide coupler of FIG. 3, wherein all of the phase compensation is accomplished adjacent to the waveguide 20 by a compensating lens 26, which has a focal length of f, thereby matching the focal length of the imaging lens 24. As can be seen, the beam of radiation is focussed at a point equidistant between the imaging lens 24 and the compensating lens 26, thereby avoiding the focusing of the beam upon the imaging lens 24.

In non-ring laser systems, the coupler must be reciprocal; that is, it must function equally well for radiation traveling in opposite directions therethrough. With equal image and object distances, the spherical phase curvature introduced by the imaging is the same in both directions, and so the phase compensation added in FIGS. 3 and 4 is correct for both directions of radiation travel. If it is desired to couple between waveguides having different bore diameters or widths, the object and image distances must be different to provide for the required amount of size scaling, M, the amount of required size scaling being the ratio of the two opening diameters.

Figure 5:
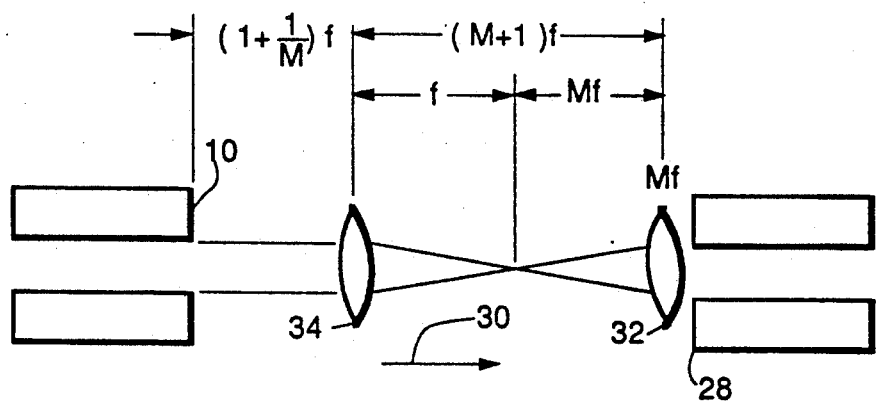
FIG. 5 is a schematic representation of a waveguide to waveguide embodiment of the present invention for coupling together waveguides having dissimilar sized bores, the embodiment having all of the phase compensation at one end.

As may be seen in FIG. 5, a beam propagating in a magnifying direction, indicated by the arrow 30, forms an image at the entrance of the larger guide 28 with a divergent phase curvature of $-1/(Mf)$, which curvature is then compensated for by a compensating lens 32 of focal length Mf. Going now in the other direction, that is from a larger waveguide 28 to the smaller waveguide 10, the laser beam first experiences the converging phase curvature of $1/(Mf)$ of the compensating lens 32. But, when such a phase curvature is scaled down in its transverse dimensions by a factor of M as it is imaged by lens 34 onto the entrance to waveguide 10, the radius of curvature is shortened by a factor of the square of the demagnification. Therefore, the image has a converging phase curvature of $M^2/(Mf) = M/f$, plus the divergent phase curvature of $-M/f$ introduced by the imaging lens 34, for a net of zero added phase curvature. Such a coupler is therefore reciprocal, even when coupling between waveguides of different sizes. This is true not only when the compensation is accomplished totally on one waveguide as in FIG. 5, but also when the total compensation is divided in any proportion between the two locations.

The preceding couplers all form an inverted image. An inverted image does not present a problem with any of the known waveguide lasers, which in general have a centro-symmetric exit opening shape, such as a waveguide laser having a circular or square bore. However, certain applications might require a bore that has a nonsymmetrical opening shape, such as a trapezoidal opening shape, or a waveguide that supports a nonsymmetric mode.

Figure 6:
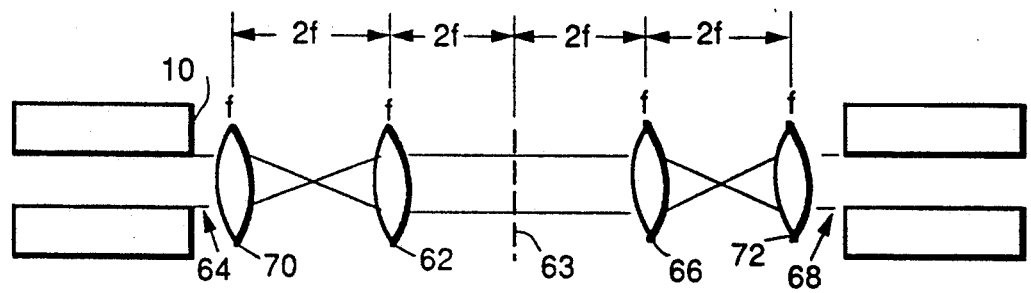
FIG. 6 is a schematic representation of a non-inverting waveguide to waveguide embodiment of the present invention having equal phase compensation at each end and a magnification of unity.

As shown in FIG. 6, if such a requirement need be satisfied, two imaging lenses may be used, each of which is large enough to capture substantially all of the beam. A first imaging lens 62 forms an intermediate image 63 of the waveguide exit 64, and a second lens 66 utilizes the intermediate image as an object and forms a second image at the waveguide entrance 68. Phase compensating lenses 70 and 72 can be proportioned in any manner between the exit 64 and entrance 68, and magnifications can be included, both from waveguide to intermediate image 63 or from waveguide to waveguide. These embodiments of the invention having an intermediate image all avoid bringing the laser beam to a focus within, or on the surface of, an optical element.

Figure 7:
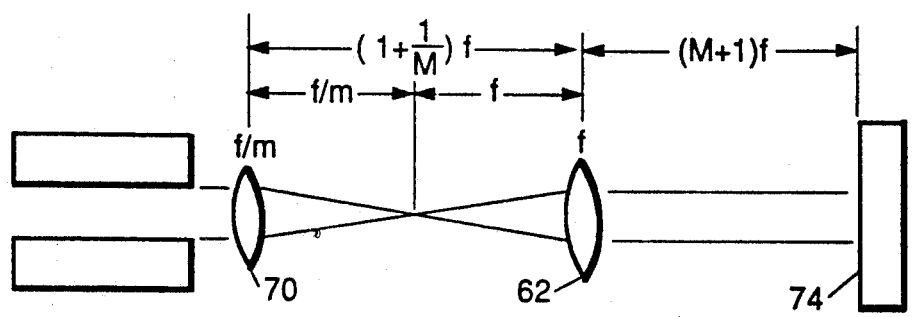
FIG. 7 is a schematic representation of an end-reflector embodiment of the present invention having a magnification of greater than unity.

As shown in FIG. 7, to provide a single waveguide end reflector, a flat mirror 74 may be placed at the intermediate image location, and the same physical lens 62 and compensator 70 may be used as in the two lens and two compensator embodiment shown in FIG. 6. The intermediate image can be of any desired size. The required spacing of these optical elements is function of focal length and magnification factor, as shown in FIG. 7.

Figure 8:
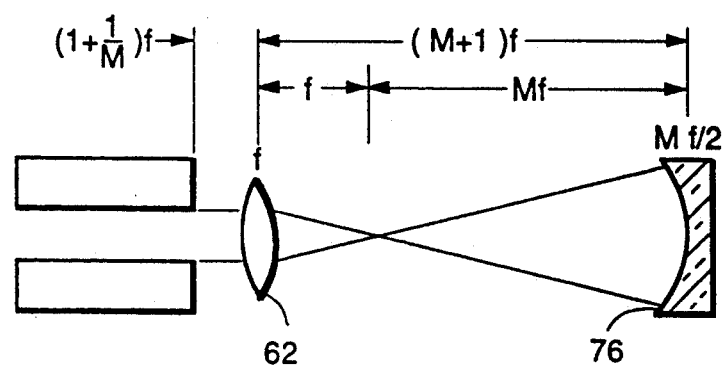
FIG. 8 is a schematic representation of still another end reflector embodiment of the present invention having a combined mirror/compensator optical element.

Such a non-inverting system advantageously provides an important additional benefit: a single compensator may be placed at the location of the intermediate image. As shown in FIG. 8 for another single waveguide end reflector embodiment of the invention, the flat mirror 74 of FIG. 7 becomes a curved mirror 76, the curvature being selected such that it adds a converging phase curvature of $2/(Mf)$. This results in the mirror 76 having a focal length of $Mf/2$. The benefits realized by this embodiment of the invention are two-fold: the number of coupler optical elements is reduced since a separate compensator lens is not required, and it does not require an optical element to be placed at the end of the waveguide. This embodiment provides coupling performance equivalent to that of FIG. 7, but with fewer optical components. It should also be noted that compensators can be placed at any or all of the available compensator locations, not just at the ends or just in the center, and additional relay lenses may be added with the required phase curvature compensation distributed over any or all of the image positions.

Modifications of this invention can be employed to bring the beam out of the waveguide, manipulate it through numerous optical devices, and return it the waveguide in a matched condition with no coupling losses.

Finally, it should be noted that the use of the invention is not limited to the infrared or optical spectrum, but can be applied to waveguide coupling in other parts of the electromagnetic spectrum (such as microwaves) as well. Similar techniques may also be used for non-waveguide laser applications.

Figure 9:
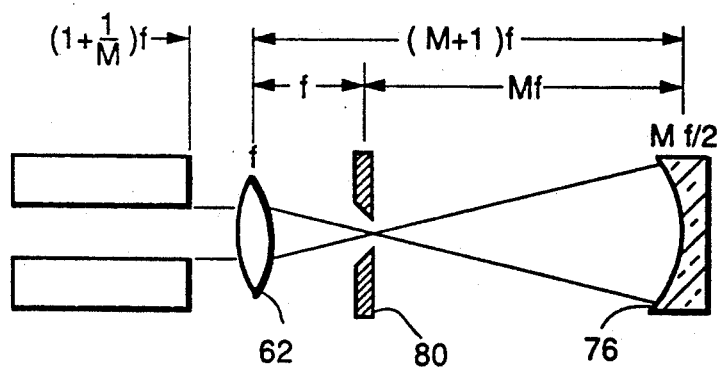
FIG. 9 is a schematic representation of the end reflector embodiment of FIG. 8 with an aperture at the intermediate focus.

In addition, as shown in FIG. 9, mode discrimination can be achieved by placing an aperture 80 around a focus of the beam. Such an aperture 80 will add a loss to the system because it will clip some energy from the fundamental mode and, because some of the energy is clipped, the reconstructed image is not an exact match of the laser mode distribution. But, there can be some practical trade off between such coupling loss and mode discrimination such that the use of such an aperture 80 to achieve mode discrimination may be desirable in some laser systems.

It is to be understood that the above described embodiments of the invention are illustrative only, and that modifications thereof may occur to those skilled in the art. One such modification may be to substitute a mirror for a lens, or a lens for a mirror depending upon a particular application's requirements. Further, the couplers may be utilized, for example in ring lasers, where the beam is brought out of one end, reflected around and directed back into the opposite end. Where multiple waveguides are not coaxial, the reflecting mirror may be positioned at the necessary angle to direct the beam exiting from one waveguide into a subsequent waveguide. Accordingly, this invention is not to be regarded as limited to the embodiments disclosed herein, but is to be limited only as defined by the appended claims.

What is claimed is:

1. A coupler for coupling a radiation beam emitted from an exit of a laser waveguide back into the waveguide whereby the irradiance distribution of the beam reentering the waveguide is a substantial reproduction of the irradiance distribution of the beam exiting the waveguide, comprising:

means for imaging the emitted beam back onto the exit of the waveguide, said means for imaging adding a phase curvature to the image; and means for phase compensating the beam to substantially eliminate the added phase curvature whereby a minimal coupling energy loss is achieved.

2. A coupler as defined in claim 1 wherein said means for imaging is a curved mirror having a focal length of f, said means for phase compensating is a lens disposed adjacent to the exit of the waveguide and wherein said mirror is disposed a distance of 2 f away from said lens.

3. A coupler as defined in claim 1 wherein said means for imaging comprises an imaging lens disposed within the beam and a mirror disposed relative to said imaging lens so that the beam is imaged thereon and is reflected from said mirror back through said imaging lens and imaged on the exit of the waveguide.

4. A coupler as defined in claim 3 wherein said imaging mirror is optically flat and said means for phase compensating comprises a phase compensation lens interposed within the beam between said imaging lens and the end of the bore.

5. A coupler as defined in claim 3 wherein said mirror has a curvature selected for phase compensating the imaged beam.

6. A coupler as defined in claim 3 wherein said imaging lens has a focal length of f and a magnification factor of M associated therewith, and wherein
said phase compensating lens is disposed adjacent to the exit of the waveguide;
said imaging lens is disposed a distance of $(1+1/M)f$ away from said phase compensating lens; and
said mirror is disposed a distance of $(M+1)f$ away from said imaging lens and wherein the focal point of said imaging lens is between said imaging lens and said phase compensating lens.

7. A coupler as defined in claim 4 wherein said imaging lens has a focal length of f and a magnification factor of M associated therewith, and wherein
said mirror has a focal length of $Mf/2$;
said imaging lens is disposed a distance of $(1+1/M)f$ away from the exit of the waveguide; and
said mirror is disposed a distance of $(M+1)f$ away from said imaging lens and wherein the focal point of said imaging lens is between said lens and said mirror.

8. A coupler for coupling a radiation beam from a first waveguide to a second waveguide, the radiation beam being emitted from an end of the first waveguide and entering an end of the second waveguide whereby the irradiance distribution of the beam reentering the waveguide is a substantial reproduction of the irradiance distribution of the beam exiting the waveguide, said coupler comprising;
means for imaging the beam from the first waveguide onto the entrance of the second waveguide, said means for imaging adding a phase curvature to the beam; and
means for phase compensating the imaged beam to substantially eliminate the added phase curvature where a minimal energy coupling loss is achieved.

9. A coupler as defined in claim 8 wherein said means for phase compensating comprises a first and a second phase compensating lens, each one of which is disposed adjacent to an exit or entrance of a respective one of the waveguides, each of said phase compensating lenses applying a phase compensation to the beam which, together, substantially eliminates the added phase curvature.

10. A coupler as defined in claim 9 wherein said means for imaging comprises an imaging lens having a focal length of f, said imaging lens being disposed between said first and said second phase compensating lenses at a distance of 2f from each of said phase compensating lenses.

11. A coupler as defined in claim 10 wherein each of said first and said second compensating lenses provides approximately one half of a total required amount of phase compensation.

12. The coupler as defined in claim 8 wherein said means for phase compensating comprises a phase compensating lens disposed adjacent to an exit or entrance of one of said first or second waveguides and wherein said means for imaging comprises an imaging lens having a focal length of f, said imaging lens being located at a distance of 2f from said phase compensating lens and at a distance of 2f from an entrance or exit of the other one of said first or second waveguides.

13. A coupler as defined in claim 8 wherein said means for imaging is an imaging lens having a focal length of f and a magnification factor of M associated therewith, said means for phase compensating is a phase compensating lens having a focal length of Mf and wherein:
said imaging lens is disposed at a distance of $(1+1/M)f$ from the exit of the first waveguide;
said phase compensating lens is disposed adjacent to the entrance of the second waveguide and at a distance of $(M+1)f$ from said imaging lens; and wherein
the value of M is related to a ratio of the cross-sectional dimensions of the first and the second waveguides.

14. A laser coupler comprising:
a mirror for reflecting a beam of radiation emitted from an exit of a waveguide back into the exit of the waveguide; and
a compensating lens disposed within the beam, said compensating lens having a focal length that provides a phase compensation to the beam whereby the phase of the reflected beam at the exit of the waveguide is substantially equal to the phase of the emitted beam at said exit.

15. A coupler according to claim 14 wherein said mirror has a curvature for imaging the exit of the waveguide back upon itself such that the radiation intensity distribution of the reflected beam at the waveguide exit is substantially equal to the radiation intensity distribution of the emitted beam.

16. A coupler according to claim 15 wherein said lens is disposed adjacent to the end of the waveguide, said mirror is spaced apart from said lens by a distance of 2f, and said mirror has a focal length of f and said lens has a focal length of 2f.

17. A coupler according to claim 14 wherein said mirror is optically flat, said coupler further comprises an imaging lens disposed between said compensating lens and said mirror, and said imaging lens provides an intermediate image of the exit of the waveguide upon a reflecting surface of the mirror and a final image back onto the exit of the waveguide.

18. A coupler according to claim 17 wherein the radiation intensity distribution of the reflected final image is substantially equal to the radiation intensity distribution of the emitted beam.

19. A coupler according to claim 18 wherein said imaging lens has a focal length of f and a magnification factor of M associated therewith, said compensating lens has a focal length of f/M, and wherein
said compensating lens is disposed adjacent to the exit of the waveguide;
said imaging lens is disposed at a distance of $(1+1/M)f$ away from said compensating lens; and
said mirror is disposed at a distance of $(M+1)f$ away from said imaging lens.

20. A coupler for coupling a radiation beam emitted from an exit of a first waveguide to an entrance of a second waveguide, comprising:
- a first phase compensating lens disposed adjacent to the exit of the first waveguide, said first phase compensating lens further being disposed within the emitted beam from the first waveguide;
- a second phase compensating lens disposed within the beam, said second phase compensating lens further being disposed adjacent to the entrance of the second waveguide; and
- a first imaging lens disposed within said beam, said imaging lens being interposed between said first and said second phase compensating lenses for imaging the exit of the first waveguide onto the entrance of the second waveguide, said first imaging lens adding a phase curvature to the image.

21. A coupler according to claim 20 wherein each of said first and said second compensating lenses provides a substantially equal amount of phase compensation to the beam, the sum of the phase compensations being approximately equal to the phase curvature added by said first imaging lens to said image.

22. A coupler according to claim 21 wherein each of said first and second waveguides is a laser waveguide, each of which has a bore having a cross-sectional size and shape approximately equal to that of the other.

23. A coupler according to claim 20 wherein each of said first and said second compensating lenses has a focal length of 2f and said first imaging lens has a focal length of f and wherein said first imaging lens is interposed substantially equidistantly between said first and said second compensating lenses at a focal point of the beam.

24. A coupler according to claim 20 further comprising a second imaging lens interposed between said first compensating lens and said first imaging lens, said second imaging lens forming an intermediate image of the exit at a point approximately equidistant between said second and said first imaging lenses, said intermediate image forming an object image for said first imaging lens whereby an image of the exit is not inverted as viewed by the entrance, said second imaging lens adding an additional phase curvature to the final image at the exit.

25. A coupler according to claim 24 wherein each of said imaging lenses and each of said compensating lenses has a focal length of f and wherein said second imaging lens is disposed at a distance of 2f away from said first compensating lens, said first imaging lens is disposed at a distance of 2f away from said second compensating lens, and wherein said first and said second imaging lenses are disposed at a distance of 4f one from the other.

26. A coupler according to claim 24 wherein a total phase compensation provided by said first and said second compensating lenses is approximately equal to the phase curvature added to the final image of the exit by said first imaging lens.

27. A coupler according to claim 24 wherein the total phase compensation provided by said first and said second compensating lenses is approximately equal to the total phase curvature added to the final image of the exit end by said first and said second imaging lenses.

28. A coupler for coupling a radiation beam emitted from the exit of a first waveguide to an entrance of a second waveguide whereby the irradiance distribution of the beam reentering the waveguide is a substantial reproduction of the irradiance distribution of the beam exiting the waveguide, the first waveguide having an opening size that is different than the opening size of the second waveguide, said coupler comprising:
- an imaging lens disposed within the beam for imaging the exit of the first waveguide onto the entrance of the second waveguide, said imaging lens having a focal length of f and a magnification factor of M associated therewith, said imaging lens further adding a spherical phase curvature to the image of the exit;
- a phase compensating lens disposed adjacent to the entrance of the second waveguide, said phase compensating lens having a focal length of Mf, said phase compensating lens compensating for the spherical phase curvature added to the image of said exit by said imaging lens; and
- said imaging lens being disposed at a distance of $(1+1/M)f$ away from the exit of the first waveguide and said compensating lens being disposed at a distance of $(M+1)f$ away from said imaging lens and adjacent to the entrance of saidsecond waveguide.

29. A coupler according to claim 28 wherein the magnitude of the magnification factor is a function of the ratio of the exit and entrance dimensions of the first and the second waveguides.

* * * * *